UNITED STATES PATENT OFFICE.

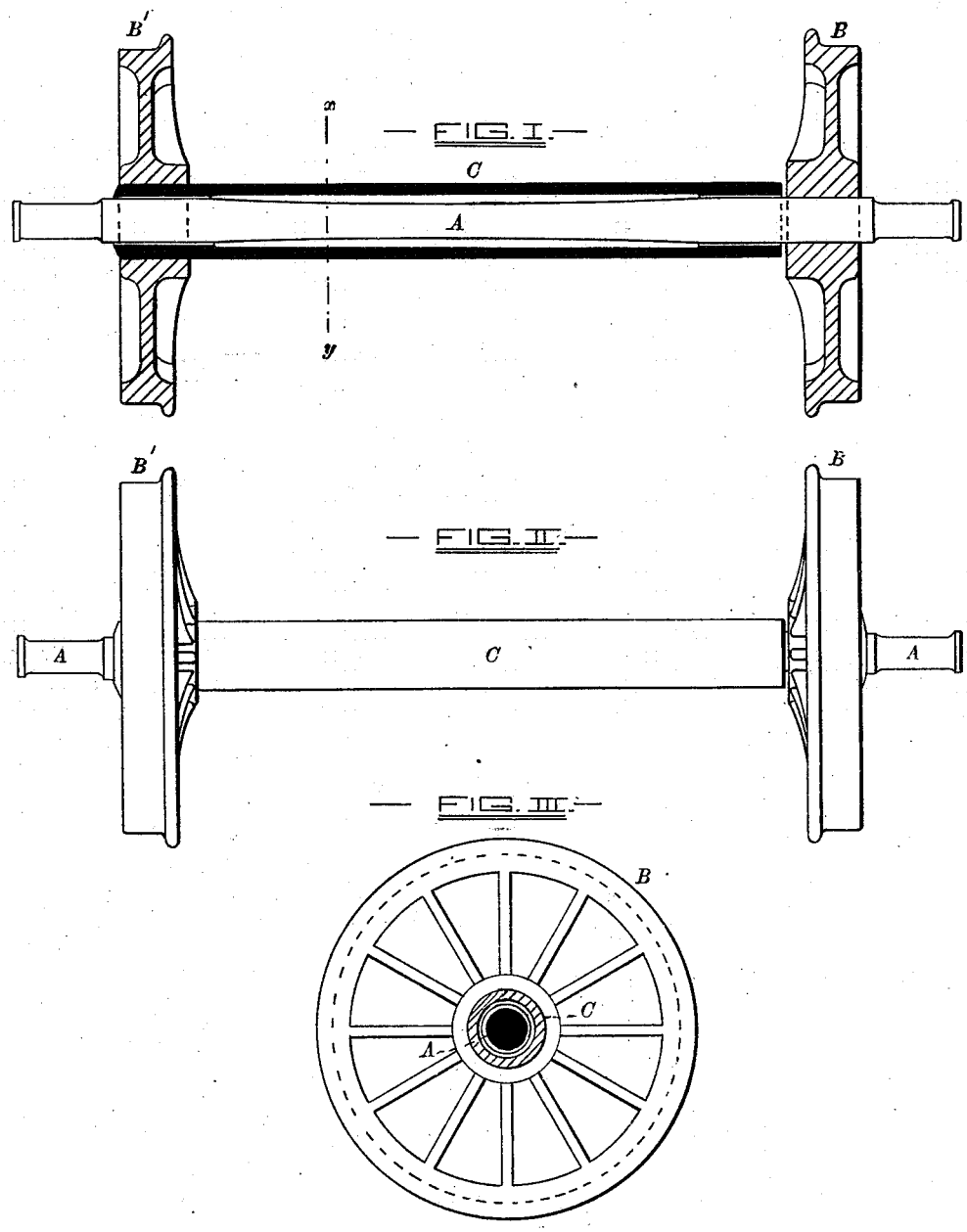

CHARLES H. RHETT, OF BALTIMORE, MARYLAND.

CAR-AXLE.

SPECIFICATION forming part of Letters Patent No. 237,906, dated February 15, 1881.

Application filed April 19, 1880. (No model.)

*To all whom it may concern:*

Be it known that I, CHARLES H. RHETT, of the city of Baltimore and State of Maryland, have invented certain Improvements in Car-Axles, of which the following is a specification; and I do hereby declare that in the same is contained a full, clear, and exact description of my said invention, reference being had to the accompanying drawings, and to the letters of reference marked thereon.

This invention relates to certain improvements in that class of car-axles in which the axle is composed of two parts—viz., the main axle, or axle proper, which is supported by the axle-boxes, and to which one of the car-wheels is secured, and an outer sleeve, which fits loosely over the axle proper, and to which the other car-wheel is fastened—the object of this construction being to allow of the independent rotation of the two wheels in rounding curves.

My improvements consist in a novel construction and arrangement of the two parts of the axle, whereby the same may be separated after the removal of the axle from the boxes, there being no securing or fastening devices to keep the two members of the axle in their proper positions other than the said boxes. By this means an injured or broken wheel can be removed and a new one substituted therefor without loss of time. My said improvements also tend to simplify the construction of the axle, as will hereinafter appear.

In the further description of my said invention which follows reference is had to the accompanying drawings, forming a part hereof, and in which—

Figure I is a longitudinal section of the improved axle, together with its wheels. Fig. II is an exterior view of the same. Fig. III is a cross-section of Fig. I on dotted lines *x y*.

Similar letters of reference indicate similar parts in all the views.

A is the main axle, the ends of which fit in the axle-boxes. B B' are the car-wheels, one of which, B, is secured to the main axle A, and the other, B', to a sleeve, C, adapted to turn loosely on the axle A. The sleeve C extends from the wheel B', in which it is secured, to near the inner face of the wheel B. The central portion of the sleeve C is preferably cored to a larger diameter than the ends thereof, to save boring, and the axle may be reduced in size where inclosed by the enlarged portion of the sleeve, to dispense with turning at that point.

I am aware that a patent for an axle was granted on the 18th day of May, 1869, to J. Van Slooten, in which an independently-moving axle and sleeve are shown; but in this patent the said parts of the axle are locked by means of a collar which enters the hub of the wheel to which the other member of the axle is secured, and the sleeve enters the hub of the other wheel, thereby reducing its strength and interfering with the independent revolution of the said sleeve, and causing undue friction. In my invention the sleeve does not come in contact with the wheel B' on the main axle, and no collar is used.

I claim as my invention—

The axle A, having the wheel B secured thereto, in combination with the sleeve C, secured to the wheel B', the axle being inserted within the sleeve, as shown, without other fastenings, and capable of withdrawal, substantially as described, and for the purpose set forth.

CHARLES H. RHETT.

Witnesses:
WM. T. HOWARD,
ROLAND RHETT.